United States Patent [19]

Robertson et al.

[11] 4,321,972
[45] Mar. 30, 1982

[54] SEED PLANTER FURROW OPENER AND FOLLOWER THEREFOR

[75] Inventors: Forrest E. Robertson; Donald E. Williams, both of Garden City, Kans.

[73] Assignee: Acra Plant, Inc., Garden City, Kans.

[21] Appl. No.: 148,121

[22] Filed: May 9, 1980

[51] Int. Cl.³ .......................... A01C 5/00; A01B 13/00
[52] U.S. Cl. ........................................ 172/721; 111/86
[58] Field of Search ............... 172/188, 190, 196, 719, 172/721, 725, 727, 728, 731, 733; 111/7, 85, 86, 87, 88

[56] References Cited

U.S. PATENT DOCUMENTS

| D. 224,745 | 9/1972 | Williams | D15/28 |
|---|---|---|---|
| D. 237,644 | 11/1975 | Williams et al. | D15/29 |
| 465,220 | 12/1891 | Steinke et al. | 111/86 |
| 613,115 | 10/1898 | Brennan et al. | 111/86 |
| 762,942 | 6/1904 | Ranson | 172/719 |
| 907,440 | 12/1908 | Baughman | 172/719 |
| 1,219,996 | 3/1917 | Peterson | 111/86 |
| 2,252,372 | 8/1941 | Hand | 111/86 |
| 3,125,169 | 3/1964 | Geisler | 172/719 |
| 3,154,030 | 10/1964 | Williams | 111/1 |
| 3,217,674 | 11/1965 | Williams | 111/86 |
| 3,509,947 | 5/1970 | Garst | 172/721 |
| 3,718,191 | 2/1973 | Williams | 172/196 |
| 3,919,951 | 11/1975 | Williams et al. | 111/7 |

*Primary Examiner*—Richard T. Stouffer
*Attorney, Agent, or Firm*—Schmidt, Johnson, Hovey & Williams

[57] ABSTRACT

In the art of plant propagation having as its object increased yields and profits for the agricultural industry through proper techniques of soil and furrow preparation, in conjunction with controlled seed orientation, a multi-purpose, wedge-shaped follower is provided for use with a soil-slicing, furrow opener of a seed planter, specially configured and sized, and strategically located on a runner in a manner to assure a truly V-shaped, seed-receiving furrow having firmed side walls, and to increase the useful life of the slicer by decreasing the wear caused by the abrasive effect of the soil thereon.

8 Claims, 10 Drawing Figures

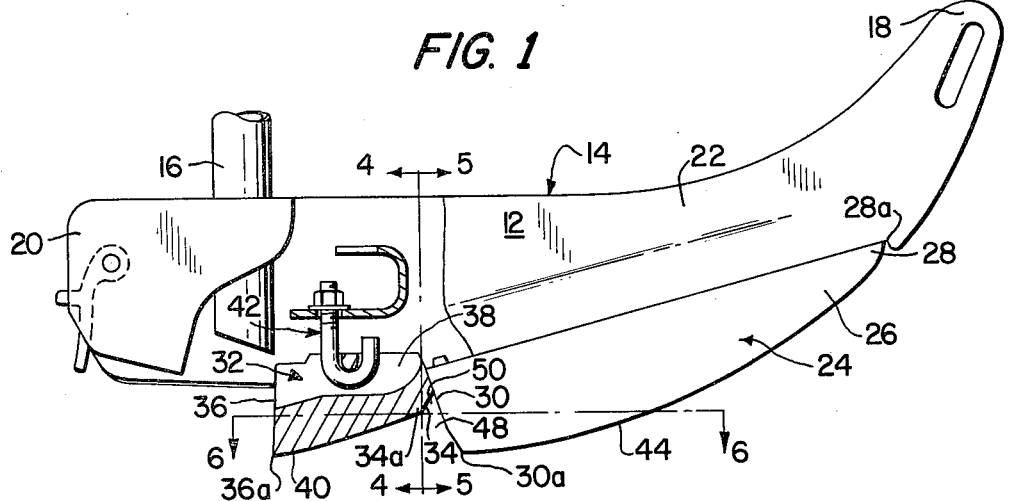
FIG. 1
FIG. 2
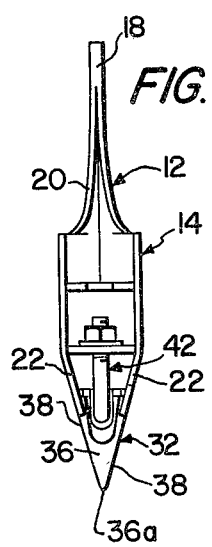
FIG. 3
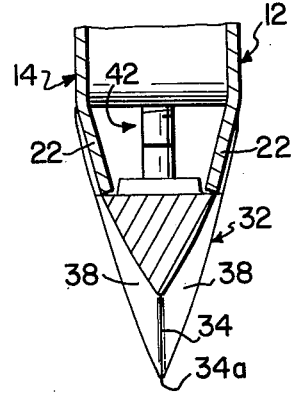
FIG. 4
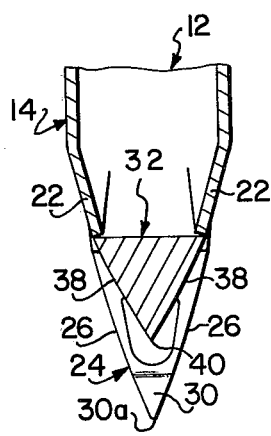
FIG. 5
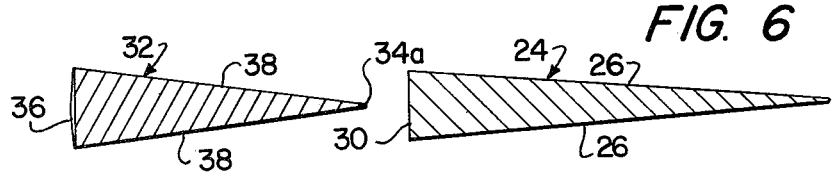
FIG. 6

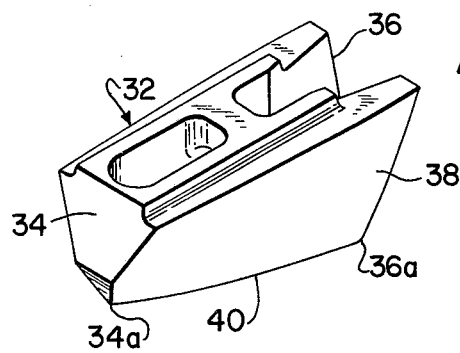
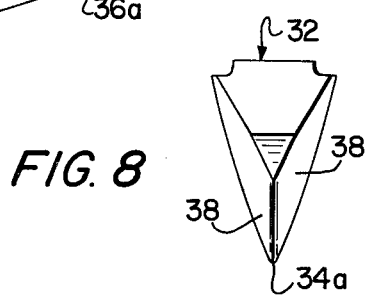
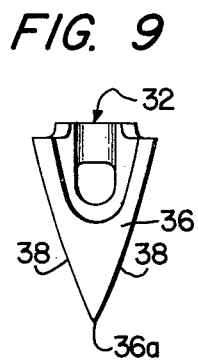
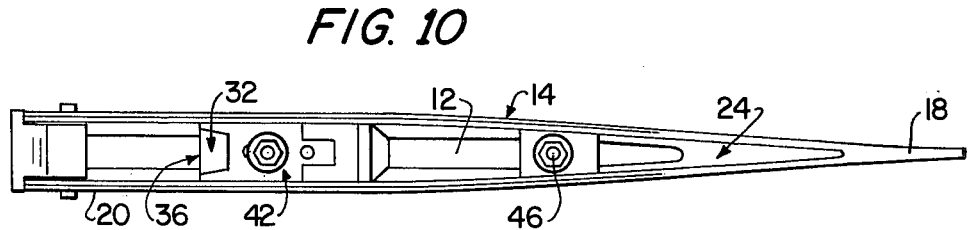

SEED PLANTER FURROW OPENER AND FOLLOWER THEREFOR

Our present invention is related to certain U.S. Pat. owned by the assignee hereof, viz.: Nos. 3,509,947; 3,718,191; 3,919,951; Des. 224,745 and Des. 237,644, but most directly to the seed oriented method of 3,154,030 and the planter shoe of 3,217,674. Inasmuch as both the method and the shoe have become highly successful through extensive and wide-spread use, no changes therein are needed or are herein contemplated.

The only material problem that has arisen is wear, believed to be sufficiently aggravating to warrant improvement on the shoe to protect its slicer. The heretofore obscure answer to the problem, which seemed to defy all prior attempts at a solution, has been achieved by the proper disposition of a novel, wedge-like follower attached to the runner in trailing relationship to the slicer such as to alleviate the adverse effects of the abrasive action of the soil on the sides and cutting edge of the slicer.

In the drawings:

FIG. 1 is a side-elevational view, partially broken away and in section showing a follower made in accordance with our present invention mounted on the runner of the soil opener of a seed planter;

FIG. 2 is a bottom view thereof;

FIG. 3 is a view showing the trailing ends of the runner and follower;

FIG. 4 is a fragmentary cross-sectional view taken on line 4—4 of FIG. 1;

FIG. 5 is a fragmentary cross-sectional view taken on line 5—5 of FIG. 1;

FIG. 6 is a cross-sectional view taken on line 6—6 of FIG. 1;

FIG. 7 is a perspective view of the follower entirely removed from the runner;

FIG. 8 is a view showing the leading end of the follower; and

FIG. 9 is a view showing the trailing end of the follower;

FIG. 10 is a plan view of the opener with the seed tube omitted.

A soil opener 12 for slicing a V-shaped, seed-receiving furrow in the soil includes an elongated runner 14 supported by a planter (not shown) in proper relationship to a seed-channeling tube 16 of the planter. The runner 14 has a front terminus 18, a rear terminus 20, a pair of opposed faces 22 spanning the distance between the termini 18 and 20 and an elongated, essentially wedge-shaped, soil slicer 24 which, in turn, has a pair of opposed sides 26, a leading end 28 and a trailing end 30.

A follower for maintaining the furrow formed by the slicer 24 is in the nature of an elongated wedge 32 (see also FIGS. 7-9) having a leading end 34, a trailing end 36, a pair of opposed sides 38 and a relatively sharp, elongated, longitudinally extending, upwardly and forwardly inclined lowermost edge 40.

Releasable structure 42 within the runner 14 supports the wedge 32, and releasable means 46 (FIG. 10) is also provided within the runner 14 for attaching the slicer 24 thereto. Manifestly, the replaceable slicer 24 and the wedge 32 may be made from material which is substantially harder than that required for the remainder of the runner 14.

The sides 38 and the edge 40 of the wedge 32 span the distance between its ends 34 and 36, and the sides 38 converge from the end 36 to the end 34. The sides 38 also converge inwardly and downwardly to the edge 40.

Similarly, the sides 26 of the slicer 24 converge from its end 30 to its end 28 and converge downwardly, terminating in a relatively sharp, elongated, longitudinally extending, lowermost, upwardly and forwardly inclined, convex edge 44 that is aligned with the straight edge 40 of the wedge 32.

The wedge 32, for alleviating wear on the slicer 24, is appreciably shorter than the slicer 24 and is disposed rearwardly of the slicer 24, immediately behind but closely adjacent the end 30, and, therefore, in trailing relationship to the slicer 24, thereby placing the slicer 24 and wedge 32 intermediate the termini 18 and 20 below the faces 22 such that the sides 26 and 38 present continuations of the faces 22.

The maximum widths of the slicer 24 and of the wedge 32 at the upper portions of their ends 30 and 36 respectively between their sides 26 and 38 should be about the same so that such width of the wedge 32 is at least as great as the maximum width of the furrow formed by the opener 12.

It is to be noted that the edges 40 and 44 merge into points 34a and 36a, 28a and 30a at the corresponding ends 34, 36 and 28, 30 and that the points 30a and 36a are generally in the same horizontal plane. On the other hand, the point 28a is in a horizontal plane which is substantially higher than the point 30a. Moreover, the point 34a is higher than the point 30a.

In addition to its function of maintaining the furrow, the wedge 32 provides the distinct and primary advantage, when used with the type of opener 12 above explained, of protecting the slicer 24. Normally, there is considerable wear on the slicer 24, especially along the sides 26 and the edge 44, commencing at the terminus 20 and continuing forwardly thereof.

Actual tests have established that there is as much as a 300 percent increase in the effective life of the slicer 24 when the wedge 32 is used in connection therewith as illustrated and described. While the reason for such good results has not been determined, and while we are not to be limited to theories, it is suspected that the wear is caused by eddies existing behind the end 30 of the slicer 24. As in the case of wakes left by a moving body in water (such as ships and boats), there appears to be currents of dirt behind the slicer 24 running contrary to the path of travel of the slicer 24 and that those dirt currents have a disadvantageous abrasive effect upon the slicer 24.

Hence, those soil currents seem to be received by and be broken up by the wedge 32 by virtue of its shape, size and strategic location with its edge 40 aligned with the edge 44 and with the apex of the furrow. To the extent then that loose dirt, clods and other material fall back into the furrow behind the slicer 24, the wedge 32 operates throughout its length in permitting proper orientation of the seeds dropping from the tube 16 immediately behind the end 36. The change effected by the wedge 32 in the turbulence reduces resistance to seed entrance into the furrow from the tube 16, permitting the seeds to descend vertically as is desired for proper seed orientation, placement and spacing.

Not without significance is the fact that the configurations of the slicer 24 and the wedge 32 and their relative dispositions presents a generally V-shaped notch 48

(as best seen in FIG. 1) behind the slicer 24, defined by its end 30 and the edge 40 of the wedge 32, together with a smaller V-shaped notch 50 above the main notch 48 and between the ends 30 and 34. This sawtooth effect in the combined slicer 24 and the wedge 32 creates better soil penetration because of the way in which the soil is not only severed by the slicer 24 and parted by the wedge 32 but is slashed in a sawing action at the points 30a, 34a and 36a as well as within the notches 48 and 50.

We claim:

1. In a planter having a soil opener for slicing a V-shaped, seed-receiving furrow in the soil, a follower for said opener comprising:

an elongated wedge having a leading end, a trailing end, a pair of opposed sides and a relatively sharp, elongated, longitudinally-extending, upwardly and forwardly inclined, lowermost edge, said sides and said edge spanning the distance between said ends, said sides converging from said trailing end to said leading end, and converging inwardly and downwardly to said edge, said wedge having structure for supporting the same in trailing relationship to the opener within the furrow formed by the latter, said structure disposing said edge in alignment with the apex of the furrow for engagement of said wedge with the soil in the furrow, the maximum width of said trailing end being at least as great as the maximum width of the furrow formed by the opener, said opener comprising an elongated runner having:
a front terminus;
a rear terminus;
a pair of opposed faces spanning the distance between said termini; and
an elongated, essentially wedge-shaped, soil slicer having a pair of opposed sides, a leading end and a trailing end, said structure interconnecting the follower and the runner, said follower being appreciably shorter than said slicer and being disposed rearwardly of the slicer, the slicer and the follower being intermediate said termini below said faces, the sides of the slicer and of the follower presenting continuations of said faces;

and means between the slicer and the follower presenting a sawtooth configuration for enhancing soil penetration.

2. In a planter having a soil opener for slicing a V-shaped, seed-receiving furrow in the soil, a follower for said opener comprising:

an elongated wedge having a leading end, a trailing end, a pair of opposed sides and a relatively sharp, elongated, longitudinally-extending, upwardly and forwardly inclined, lowermost edge, said sides and said edge spanning the distance between said ends, said sides converging from said trailing end to said leading end, and converging inwardly and downwardly to said edge, said wedge having structure for supporting the same in trailing relationship to the opener within the furrow formed by the latter, said structure disposing said edge in alignment with the apex of the furrow for engagement of said wedge with the soil in the furrow, the maximum width of said trailing end being at least as great as the maximum width of the furrow formed by the opener, said opener comprising an elongated runner having:
a front terminus;
a rear terminus;
a pair of opposed faces spanning the distance between said termini; and
an elongated, essentially wedge-shaped, soil slicer having a pair of opposed sides, a leading end and a trailing end, said structure interconnecting the follower and the runner, said follower being appreciably shorter than said slicer and being disposed rearwardly of the slicer, the slicer and the follower being intermediate said termini below said faces, the sides of the slicer and of the follower presenting continuations of said faces, said sides of the slicer converging from its trailing end to its leading end, said sides of the slicer converging downwardly and inwardly, terminating in a relatively sharp, elongated, longitudinally-extending, upwardly and forwardly inclined, lowermost edge aligned with said edge of the follower, said edges merging into points at corresponding leading and trailing ends of the slicer and follower respectively.

3. The invention of claim 2, the points at the trailing ends being generally in the same horizontal plane.

4. The invention of claim 3, the point at the leading end of the slicer being in a horizontal plane higher than the point at the leading end of the follower.

5. The invention of claim 4, the maximum widths of the trailing ends of the slicer and the follower between their sides being substantially the same.

6. The invention of claim 5, the leading end of the follower being closely adjacent and immediately behind the trailing end of the slicer.

7. The invention of claim 6, said edge of the follower being straight, said edge of the slicer being convex.

8. In a planter, a runner for opening a V-shaped, seed-receiving furrow, said runner being provided with:

an elongated, transversely V-shaped, leading slicer secured thereto therebeneath, and provided with a leading and a trailing end, said slicer having a pair of opposed sides tapering downwardly and inwardly, converging toward a relatively sharp, lowermost, longitudinal cutting edge sloping upwardly and forwardly from its trailing to its leading end, the width of the slicer progressively decreasing as said leading end is approached; and a wedge-like follower attached to the runner therebeneath directly and entirely behind said trailing end for maintaining the V-shape of the furrow opened by the slicer and for alleviating the adverse effects of the abrasive effects of soil on said sides and said edge, said follower having a pair of opposed sides tapering downwardly and inwardly, converging toward a relatively sharp, lowermost cutting edge sloping upwardly and forwardly as the slicer is approached, the width of the follower progressively decreasing as the slicer is approached, the maximum rear widths of the slicer and the follower being substantially equal, said edges being at approximately the same height at their rearmost extremities, the forwardmost extremity of said edge of the follower being appreciably higher than the rearmost extremity of said edge of the slicer, all of said sides being fully exposed for soil engagement during formation of said furrow prior to seeding therein.

* * * * *